US00RE45308E

(19) United States
(12) Reissued Patent
Kolar et al.

(10) Patent Number: US RE45,308 E
(45) Date of Reissued Patent: Dec. 30, 2014

(54) ENCLOSURE FOR A BLENDER

(71) Applicants: David J. Kolar, Stow, OH (US); Robert M. Ulanski, Broadview Heights, OH (US)

(72) Inventors: David J. Kolar, Stow, OH (US); Robert M. Ulanski, Broadview Heights, OH (US)

(73) Assignee: Vita-Mix Corporation, Olmsted Township, OH (US)

(21) Appl. No.: 13/909,796

(22) Filed: Jun. 4, 2013

Related U.S. Patent Documents

Reissue of:

(64) Patent No.: 8,287,180
Issued: Oct. 16, 2012
Appl. No.: 12/380,468
Filed: Feb. 27, 2009

U.S. Applications:

(60) Provisional application No. 61/135,480, filed on Jul. 21, 2008.

(51) Int. Cl.
*B01F 15/00* (2006.01)
*A47J 43/07* (2006.01)

(52) U.S. Cl.
USPC ..... 366/347

(58) Field of Classification Search
CPC ..... A47J 43/0716
USPC ..... 366/347
See application file for complete search history.

(56) References Cited

U.S. PATENT DOCUMENTS

| | | | | | |
|---|---|---|---|---|---|
| 2,372,862 | A | | 4/1945 | Strauss et al. | 259/84 |
| D237,503 | S | | 11/1975 | Langmack, Jr. et al. | D26/5 R |
| 3,961,721 | A | * | 6/1976 | Gordon et al. | 220/230 |
| D249,870 | S | | 10/1978 | Tillander | D9/224 |
| D295,012 | S | | 4/1988 | Gelber | D7/378 |
| 4,822,175 | A | | 4/1989 | Barnard et al. | 366/347 |
| D301,824 | S | | 6/1989 | Machuron | D7/384 |
| 4,883,144 | A | | 11/1989 | Haushalter et al. | 181/198 |
| D321,647 | S | | 11/1991 | Oldorf | D9/432 X |
| 5,533,797 | A | | 7/1996 | Gelber | 312/138.1 |
| 5,696,358 | A | | 12/1997 | Pfordresher | 181/198 |
| D406,154 | S | | 2/1999 | Copland et al. | D15/82 |

(Continued)

FOREIGN PATENT DOCUMENTS

| | | |
|---|---|---|
| WO | WO 2009/000042 | 12/2008 |
| WO | WO 2009000042 A1 * | 12/2008 |

OTHER PUBLICATIONS

Summit OPeration Manual—Hamilton Beach Nov. 2007.*

(Continued)

*Primary Examiner* — Alison Hindenlang
(74) *Attorney, Agent, or Firm* — McDonald Hopkins LLC

(57) ABSTRACT

An enclosure for a blender includes a body portion and a cover. The cover is hingedly attached to the body portion. The body portion of the enclosure includes a metallic foot that mates with the base member of the blender. The base member may include at least one magnet that secures the foot, and therefore body portion, in position by the magnetic force acting upon the foot. A gasket is provided between the foot of the body portion and the base member to completely isolate the enclosure from the base member, and to reduce vibrations in the enclosure during operation of the blender. The body portion of the enclosure may also include gasket strips to seal the enclosure when the cover is closed.

16 Claims, 4 Drawing Sheets

(56) References Cited

U.S. PATENT DOCUMENTS

| | | | | |
|---|---|---|---|---|
| 5,957,577 | A | 9/1999 | Dickson et al. | 366/197 |
| 6,059,445 | A | 5/2000 | St John et al. | 366/205 |
| D426,423 | S | 6/2000 | Lee | D7/384 |
| D427,016 | S | 6/2000 | Kindig et al. | D7/412 |
| D428,564 | S | 7/2000 | Kao | D7/374 |
| D432,864 | S | 10/2000 | Kindig et al. | D7/412 |
| D466,761 | S | 12/2002 | Baerenrodt et al. | D7/378 |
| D471,059 | S | 3/2003 | Chuang | D7/374 |
| 6,571,908 | B2 | 6/2003 | Bohannon et al. | 181/198 |
| D526,845 | S | 8/2006 | Katz et al. | D7/412 |
| D528,364 | S | 9/2006 | Kolar et al. | D7/413 |
| 2003/0034200 | A1 | 2/2003 | Bohannon et al. | 181/202 |
| 2003/0042805 | A1 | 3/2003 | Bates et al. | 310/58 |
| 2005/0152215 | A1 | 7/2005 | Stuart et al. | 366/205 |

OTHER PUBLICATIONS

PCT International Search Report for PCT/US2009/003745 dated Apr. 11, 2009.*
PCT Written Opinion for PCT/US2009/003745 dated Jul. 21, 2008.*
Blendtec Operations Manual—Blendtec Apr. 2006.*
Xtreme—Waring 2006.*
Q Seris—Blendtec May 2006.*
PCT International Preliminary Report and Written Opinion (11 pages—dated Jul. 21, 2008).
Q Series—Blendtec (May 2006—2 pages).
Xtreme—Waring (2006—2 pages).
Blendtec Operations Manual—Blendtec (Apr. 2006—15 sheets).
Summit Operation Manual—Hamilton Beach (Nov. 2007—pp. 1, 4, 6, 7, 8).
PCT International Search Report (14 pages—dated Apr. 11, 2009).

* cited by examiner

ENCLOSURE FOR A BLENDER

Matter enclosed in heavy brackets [ ] appears in the original patent but forms no part of this reissue specification; matter printed in italics indicates the additions made by reissue.

CROSS-REFERENCE TO RELATED APPLICATION

This application claims priority from U.S. Provisional Application No. 61/135,480 filed Jul. 21, 2008, which is incorporated herein by reference.

TECHNICAL FIELD

This invention relates to an enclosure such as those which house a food processor to deaden the noise emanating therefrom. More particularly, this invention relates to such an enclosure having a main body positioned on the base of a food processor, with a gasket positioned between the main body and the base to isolate vibrations and reduce noise.

BACKGROUND ART

Enclosures for electric food processors, or blenders, are well known in the art. One such enclosure is shown, for example, in U.S. Pat. No. Des. 427,016. These types of enclosures are utilized to house a conventional electric blender so that when the blender is in operation, the noise emanating therefrom will be muffled. This noise suppression function is particularly desirable when the blender is being operated in a commercial environment, such as a restaurant or cocktail lounge, so that the customers are not distracted or bothered by the sound of the blender that is processing a beverage.

Blenders include a base and a container, the base having controls and a motor, and the container being adapted to contain ingredients to be mixed. A rotating blade is provided at the bottom of the container and blends ingredients within the container when activated by the motor. The blender may also include an enclosure, as discussed above. Most typical enclosures are formed of two components, that is, a main body and a cover. Usually the cover is hingedly attached to the main body, and the main body is attached to the base of the blender by a plurality of fasteners. As such, when the container of the blender is positioned on the base, it may be accessed by pivoting the cover relative to the main body.

Because it is associated with food products, the enclosure must be frequently cleaned. To do so, some enclosures, such as that shown in U.S. Pat. No. 6,019,238, allow the cover to be totally removed from the main body by means of an easy disconnection of the hinge. However, the main body still needs to be disconnected from the blender base which normally requires the manual manipulation of several fasteners which not only is time consuming, but which also, after frequent manipulations, causes wearing of the parts such that a sturdy connection can no longer be maintained. In addition, the direct connection between the main body of the enclosure and the base of the blender acts to transfer vibrations emanating from the base to the enclosure, compounding the noise generated by the blender when in operation. Regardless of the type of connection used between the main body of the enclosure and the base of the blender, vibrations are transferred at any point of direct contact.

Thus, the need exists for a blender having an enclosure which can easily and quickly be disassembled while providing improved noise reduction capabilities.

DISCLOSURE OF THE INVENTION

It is thus an object of one aspect of the present invention to provide an enclosure for a food processor which is capable of deadening the noise resulting from the blending of ingredients within a container.

It is an object of another aspect of the present invention to provide an enclosure, as above, that isolates the vibrations of the motor within the base of the food processor from the enclosure positioned thereon.

It is an object of another aspect of the present invention to provide an enclosure, as above, which is secured to the base without the use of mechanical fasteners.

These and other objects of the present invention, as well as the advantages thereof over existing prior art forms, which will become apparent from the description to follow, are accomplished by the improvements hereinafter described and claimed.

In general, an enclosure for a food processor having a base includes body portion, a cover pivotally attached to the body portion, and a foot carried by the body portion. A gasket is provided between the top surface of the base and the foot of the enclosure. The gasket isolates the enclosure from the base to prevent the transfer of vibrations therebetween.

The combination of an enclosure and the base of a food processor is provided in accordance another aspect of the present invention. The base has a top surface and the enclosure includes a body portion, a cover pivotally attached to the body portion, and a plate carried by the body portion. A gasket is provided between the top surface of the base and the foot. The gasket isolates the enclosure from the base to prevent the transfer of vibrations therebetween. No mechanical fasteners are provided to secure the enclosure to said base.

In accordance with yet another aspect of the present invention, an enclosure for a food processor having a base is provided. The base has a top surface and the enclosure includes a foot. A gasket is also provided and is positioned between the top surface of the base and the foot. The gasket isolates the enclosure from the base to prevent the transfer of vibrations therebetween. No mechanical fasteners are provided to secure the enclosure to said base.

A preferred exemplary enclosure for a food processor according to the concepts of the present invention is shown by way of example in the accompanying drawings without attempting to show all the various forms and modifications in which the invention might be embodied, the invention being measured by the appended claims and not by the details of the specification.

PREFERRED EMBODIMENT FOR CARRYING OUT THE INVENTION

Figure 1:
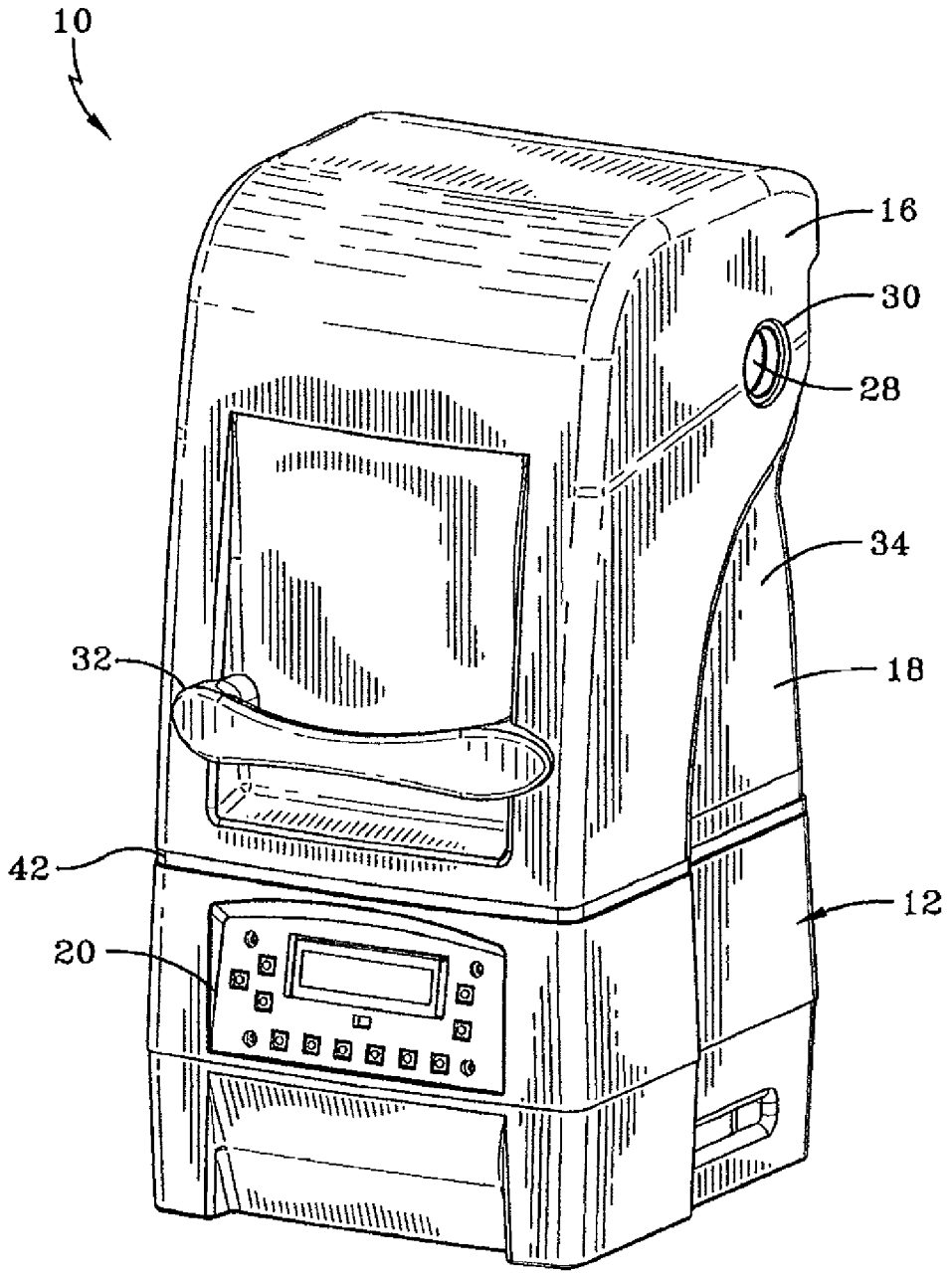
FIG. 1 is a perspective view of an enclosure for a food processor made in accordance with the concepts of the present.
Figure 2:
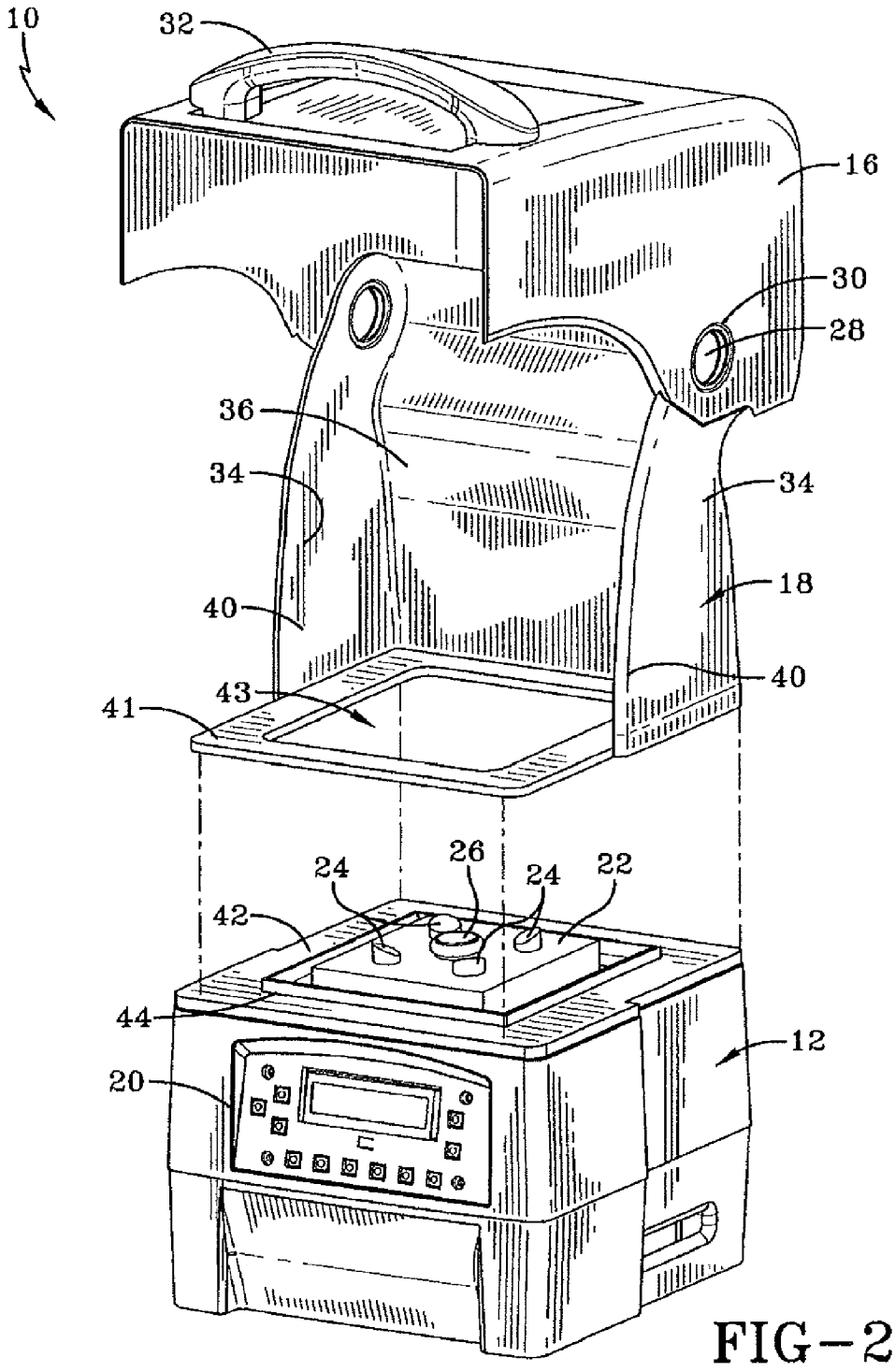
FIG. 2 is a perspective view of the enclosure of FIG. 1 with the cover in an open position.

An enclosure for a food processor made in accordance with the present invention is indicated generally by the numeral 10. A base member of a food processor, generally indicated by the numeral 12, houses a motor. Enclosure 10 includes a cover 16 and a body portion 18 and is designed to be positioned over base member 12. The container (not shown) of the blender is positioned on the base member 12 and housed within enclosure 10 so that when the blender is in use, the noise generated by the operation of the blender is muffled. Cover 16 and body portion 18 are preferably made of a clear thermoplastic material, such as polycarbonate or polyester, so that the container of the blender positioned on base member 12 can be viewed.

Base member 12 often includes a control panel 20 on one of its surfaces where the blender can be turned on and off, and the speed of rotation of the motor can be adjusted. An opening (not shown) may also be provided in base member 12 so that an electric cord can pass from within to provide power to the motor housed within base member 12. Base member 12 also includes a raised pedestal 22 on a top surface thereof which is adapted to be received in the base of the container. Pedestal 22 may optionally include a number of projections 24 which prevent the container from rotating when the motor within base member 12 is actuated. In addition, pedestal 22 also includes a coupler having a splined end 26, the coupler being attached to the rotating motor shaft, as is well known in the art. The shaft of the blade of the blender container is also splined and engages splined end 26 of the coupler. Rotation of the motor shaft caused by the actuation of the motor is thereby transferred to the blades rotatably positioned within the container.

Figure 3:
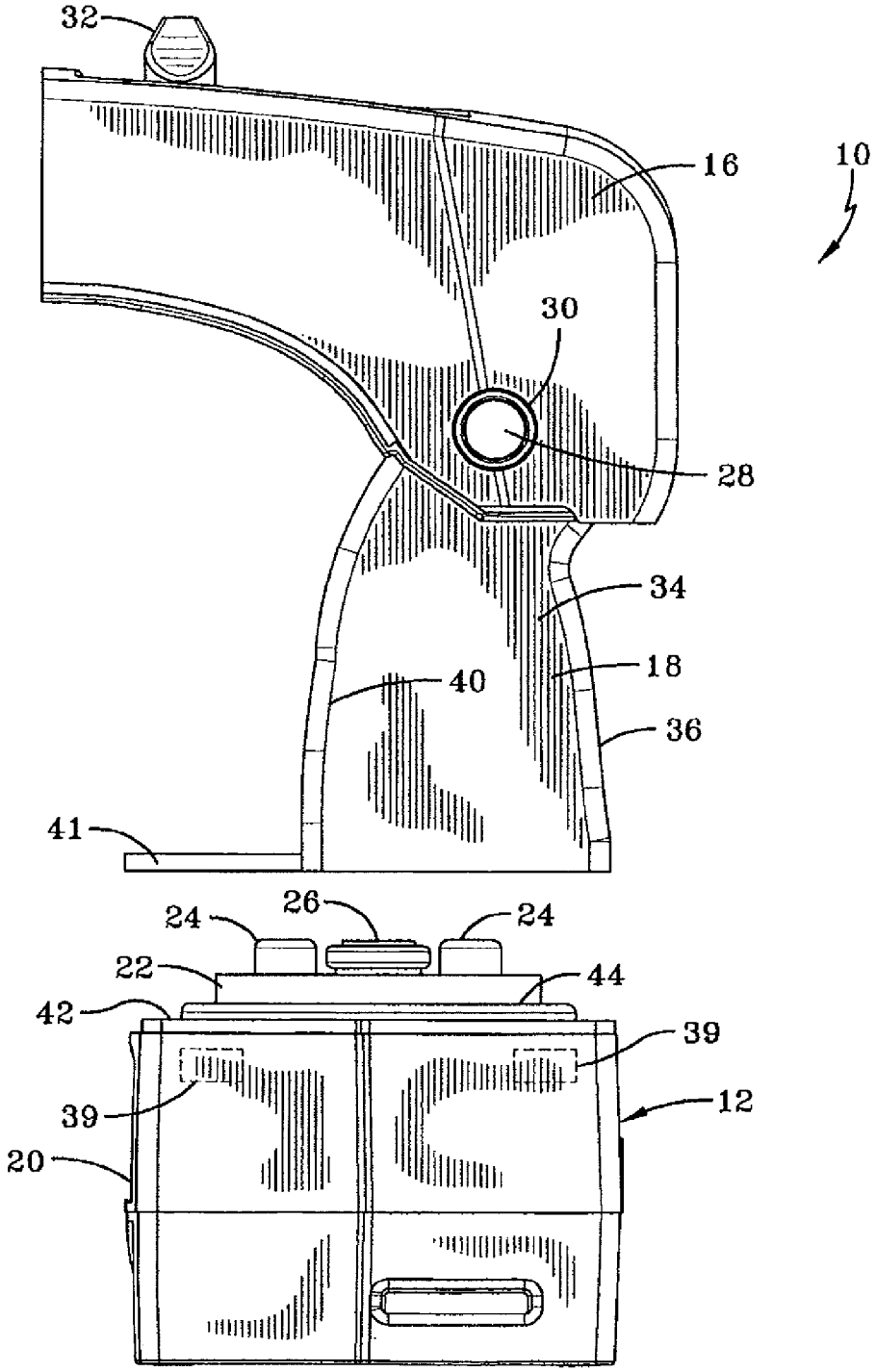
FIG. 3 is an exploded side elevational view of the enclosure of FIG. 1.

As best shown in FIG. 1, body portion 18 of enclosure 10 includes opposed side walls 34 spanned by a rear wall 36 and an abbreviated top wall (not shown). Body portion 18 has an open front area opposed to rear wall 36, which front area is closed by cover 16 to form enclosure 10. Cover 16 of enclosure 10 is pivotally secured to body portion 18 such that it can be moved from a closed position to an open position, allowing access to the interior of enclosure 10. Cover 16 may be pivotally connected to body portion 18 by any method known in the art, such as, for example, a pair of sockets 28 on body portion 18 and a pair of corresponding apertures 30 in cover 16, as shown in FIGS. 1 and 3. Cover 16 is thus pivotable with respect to body portion 18 on an axis defined by sockets 28, and a handle 32 may be provided to conveniently assist in the opening and closing of enclosure 10. Body portion 18 may include gasket strips 40 on sidewalls 34 and the top wall to seal enclosure 10. Thus gasket strips 40 may be positioned at various positions on the outer surfaces of body portion 18 so that when cover 16 is closed, enclosure 10 is sealed and noise emanating therefrom during operation of the blender is reduced.

Body portion 18 also includes a foot 41 at the bottom of rear wall 36 and sidewalls 34. Foot 41 is made of a metallic material and is generally rectangular in shape, although it may optionally take any desired shape. Foot 41 is provided with an opening 43, rectangular in nature, and having an inner periphery that is larger than the outer periphery of pedestal 22 so that pedestal 22 protrudes upwardly through the opening 43 in foot 41 when body portion 18 is positioned on base member 12. At least one magnet 39 may be provided within base member 12 to impart a magnetic force on metal foot 41. In one embodiment of the invention, four magnets 39 are provided, one at each of the corners of base member 12 adjacent to its top surface (FIG. 3). The magnetic force provided by the magnets within base member 12 secures body portion 18 of enclosure 10 to base member 12 without the use of mechanical fasteners. While a particular method of securing enclosure 13 to base 12 is described and shown herein, it is also contemplated that other means may be employed to secure enclosure 10 to base 12 without the use of mechanical fasteners. Thus, any method or mechanism known in the art, other than mechanical fasteners, may be utilized to secure enclosure 10 to base 12 without deviating from the scope of the invention. In one alternative embodiment, foot 41 is provided with sufficient weight so that no other mechanism is required to secure enclosure 10 to base 12.

Figure 4:
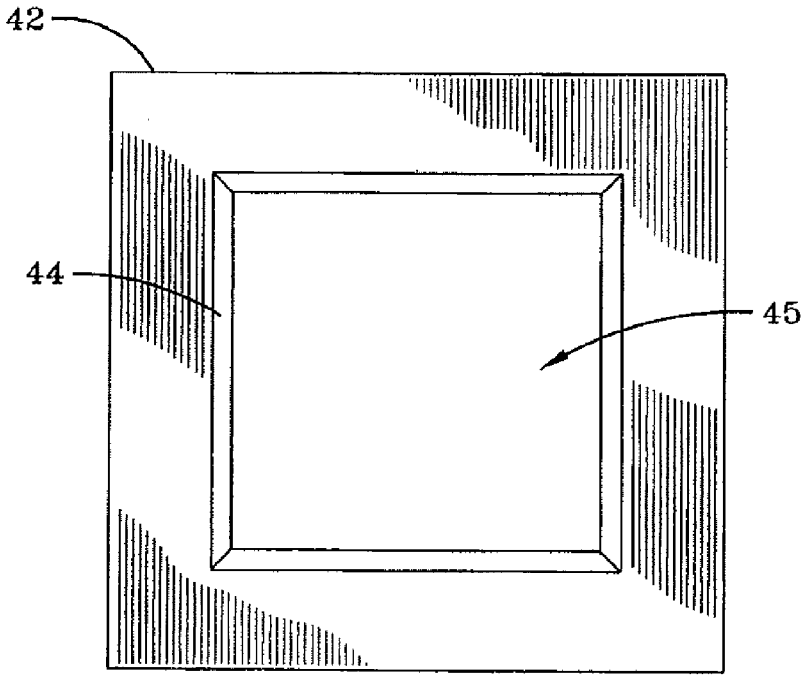
FIG. 4 is an enlarged top view of a gasket made in accordance with the concepts of the present invention.
Figure 5:
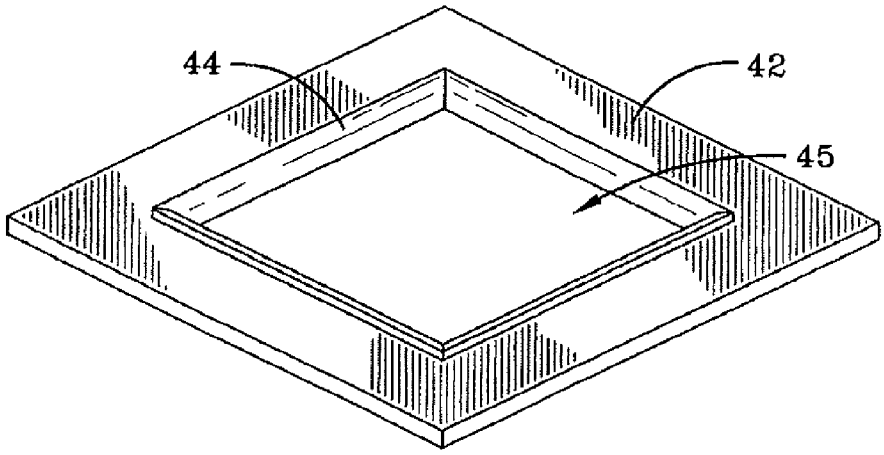
FIG. 5 is a perspective view of the gasket shown in FIG. 4.

A gasket 42, shown in FIGS. 4 and 5, is provided between foot 41 and base member 12. Gasket 42 mirrors the shape of foot 41 and, in the embodiment shown in the drawings, is rectangular in shape, and has an opening 45 therein. Gasket 42 rests on base member 12 around pedestal 22 without the use of any type of fasteners or adhesive. If magnets 39 are provided, their force acting upon foot 41 serves to secure gasket 42 in the desired location. Gasket 42 may include an upwardly extending flange 44 around its inner periphery. Flange 44 is adjacent to pedestal 22 and separates foot 41 from pedestal. Gasket 42 may be made of any material capable of absorbing and dampening vibrations created by the motor within base member 12. In one embodiment, gasket 42 may be made of a viscoelastic material, such as, for example, amorphous polymers, semi crystalline polymers, biopolymers, and bitumen materials. Thus, enclosure 10 is completely separated from base member 12 by a vibration dampening gasket 42, thereby significantly reducing the vibrations that are transferred from base member 12 to enclosure 13. By reducing the vibrations of enclosure 10 during operation of the food processor, the sound emitted is also significantly reduced.

It is thus evident that an enclosure for a food processor constructed as described herein accomplishes the objects of the present invention and otherwise substantially improves the art.

What it claimed is:

1. An enclosure for use with a blender that includes a base, the enclosure comprising a body portion, a cover pivotally attached to said body, said cover and said body together having a bottom edge profile that defines a footprint of the enclosure, said footprint having a plurality of sides, a foot carried by said body portion and extending outwardly therefrom, said foot having a like plurality of sides, each side of said foot being positioned adjacent to a side of said footprint of the enclosure, and a gasket positioned [between the top surface of the base and] *below* said foot, wherein said gasket isolates the enclosure from the base to prevent the transfer of vibrations therebetween.

2. The enclosure of claim 1, wherein the base includes a pedestal projecting upwardly from the top surface, said foot including an opening sized to allow the pedestal to extend therethrough.

3. The enclosure of claim 2, wherein said gasket includes an opening therethrough sized and shaped to allow the pedestal to extend upwardly therethrough.

4. The enclosure of claim 3, wherein said gasket includes an upwardly extending flange around said opening, said flange positioned between the pedestal and said foot.

5. The enclosure of claim 1, wherein said gasket is made of a viscoelastic material.

6. The enclosure of claim 1, further comprising gasket strips positioned on said body portion, said gasket strips being adapted to create a seal between said body portion and said cover when said cover is in a closed position.

7. The enclosure of claim 1, further comprising a magnet within the base, wherein said foot of said enclosure is made of metal, said foot being secured to said base by the magnet.

8. In combination, an enclosure and a base of a food processor, the base having a top surface, said enclosure including a body portion, a cover pivotally attached to said body portion, a foot carried by said body portion and extending outwardly therefrom, said foot defining an inner opening adapted to fit around a pedestal projecting upwardly from said top surface of said base, said foot extending around the entire periphery of said pedestal; and a gasket positioned [between said top surface of said base and] *below* said foot, wherein said gasket isolates said enclosure from said base to prevent the transfer of vibrations therebetween, and wherein no mechanical fasteners are provided to secure said enclosure to said base.

9. The combination of claim 8, wherein said gasket includes an opening therethrough sized and shaped to allow said pedestal to extend upwardly therethrough.

10. The combination of claim 9, wherein said gasket includes an upwardly extending flange around said opening, said flange positioned between said pedestal and said foot.

11. The combination of claim 8, wherein said gasket is made of a viscoelastic material.

12. The combination of claim 8, further comprising gasket strips positioned on said body portion of said enclosure, said gasket strips being adapted to create a seal between said body portion and said cover when said cover is in a closed position.

13. An enclosure for use with a blender that includes a base with a top surface, the enclosure comprising a body, a cover pivotally connected to said body, said cover and said body together having a bottom edge profile that defines a footprint of the enclosure, said footprint having a plurality of sides, a foot extending outwardly from a bottom edge of said body and having a generally planar bottom surface, said foot having a like plurality of sides, each side of said foot being positioned adjacent to a side of said footprint of the enclosure, and a generally planar gasket positioned [between the top surface of the base and] *below* said bottom surface of said foot, wherein said gasket isolates the enclosure from said base to prevent the transfer of vibrations therebetween, and wherein no mechanical fasteners are provide to secure said enclosure to said base.

14. The enclosure of claim 13, wherein the base includes a pedestal projecting upwardly from the top surface, and said foot includes an opening sized to allow the pedestal to extend therethrough.

15. The enclosure of claim 14, wherein said gasket includes an opening therethrough sized and shaped to allow the pedestal to extend upwardly therethrough.

16. The enclosure of claim 15, wherein said gasket includes an upwardly extending flange around said opening, said flange positioned between the pedestal and said foot.

* * * * *